(12) United States Patent
Staschik

(10) Patent No.: US 7,459,077 B2
(45) Date of Patent: Dec. 2, 2008

(54) PORTABLE APPARATUS FOR IN-TRANSPORT TREATMENT OF WASTE

(76) Inventor: Udo Staschik, 261 Albany Street, Winnipeg, Manitoba (CA) R3J 2A9

( * ) Notice: Subject to any disclaimer, the term of this patent is extended or adjusted under 35 U.S.C. 154(b) by 201 days.

(21) Appl. No.: 11/307,995

(22) Filed: Mar. 2, 2006

(65) Prior Publication Data

US 2006/0249454 A1 Nov. 9, 2006

Related U.S. Application Data

(60) Provisional application No. 60/658,582, filed on Mar. 7, 2005.

(30) Foreign Application Priority Data

Mar. 3, 2005 (CA) .................................. 2499656

(51) Int. Cl.
 *C02F 3/00* (2006.01)
(52) U.S. Cl. ................... 210/195.1; 210/196; 210/241; 210/242.1; 210/242.2
(58) Field of Classification Search .............. 210/195.1, 210/196, 241–242.2
 See application file for complete search history.

(56) References Cited

U.S. PATENT DOCUMENTS

| 4,836,921 | A | * | 6/1989 | Hahn et al. | .................. 210/202 |
| 5,520,803 | A | * | 5/1996 | Russell et al. | ................ 210/182 |
| 2002/0153324 | A1 | * | 10/2002 | Lynch | ......................... 210/688 |
| 2005/0247647 | A1 | * | 11/2005 | Hills | ........................... 210/787 |

\* cited by examiner

*Primary Examiner*—Chester T Barry
(74) *Attorney, Agent, or Firm*—Standley Law Group LLP

(57) ABSTRACT

A method and portable system is disclosed for treating waste water received at a first location while in-transit to a second location. Waste water received by a portable treatment system is used to treat waste water while stationary at a first location and then the portable waste water system continues to treat the waste water while the portable treatment system is in-transit between the first location and a second location. This allows the transit time of the portable treatment system to be utilized to improve the quality of the waste water in the portable treatment system. Untreated waste water can be received by the system at a first location and during transport the waste water is treated by the portable treatment system, improving the quality of the effluent discharged from the portable treatment system when it arrives at the second location.

20 Claims, 2 Drawing Sheets

PORTABLE APPARATUS FOR IN-TRANSPORT TREATMENT OF WASTE

DESCRIPTION

This invention is in the field of waste water treatment and in particular waste water treatment for remote locations.

BACKGROUND

Dealing with waste water is an issue for temporary and/or remote locations. Construction, mining, oilfields and military operations are all industries that often require providing personnel at temporary and/or remote locations, often for a relatively short time and for a relatively few number of people. Waste water in the form of black water from human waste and other sources and grey water has to be dealt with at these temporary and/or remote locations.

For example, in the oilfield business well sites often require a workforce of a half dozen personal or less for a short period of time to service a well site. Sometimes these work crews can be present at a well site for only a few days or as little time as a few hours. These well sites are typically in remote locations making it uneconomical to provide waste treatment facilities at these sites on a permanent basis.

Additionally, waste water facilities in remote locations can fail and the waste water at these remote locations must be dealt with during the time the normal waste water facilities are not operating.

Historically, these work sites could simply dump their untreated waste water on or in the ground; however, regulations have put an end to this practice in many areas and now the untreated waste water at these sites must be dealt with in another way. While a waste water treatment facility can be constructed at the remote site, this is often uneconomical for work camps that are only temporary or are unoccupied for long periods of time. Typically at these sites this waste water and raw sewage generated by the people at the site is stored in a portable tank. When the portable tank is full of untreated waste water or the people are leaving the site, the portable tank full of untreated waste water is then transported to a suitable waste water treatment facility or other location that will accept the untreated waste water and the untreated waste water in the portable tank is then discharged at the discharge location. Once the untreated waste water is discharged from the portable tank at the discharge area, the portable tank can then be transported back to the work site or it can be transported to a new site location and once more used to store waste water.

This system of transporting untreated waste water requires the untreated waste water to be transported to a facility that accepts the untreated waste water. Disposal sites that will accept this untreated waste water can be quite far from the temporary work sites, especially in more remote locations, requiring the portable tank to be transported quite far to and from the disposal site. It can also cause logistical problems with moving sites because the portable tank of waste water might have to be transported quite far away from the new site causing the waste water tank to not arrive at the new site until much after the personnel have arrived at the new site.

Additionally, waste water treatment facilities typically charge a higher rate for taking untreated waste water.

SUMMARY OF THE INVENTION

It is an object of the present invention to provide a method and apparatus that improves upon the prior art.

The present invention provides, in a first embodiment a portable waste water treatment system capable of treating waste water while the system is in transit. The system comprises an inlet conduit operative to receive waste water into a septic tank, a recirculation tank operatively connected to an outlet of the septic tank, a treatment tank operative to filter liquid passing through the treatment tank wherein liquid is introduced at an input end of the treatment tank and the liquid flows through the treatment tank to exit the treatment tank at an output end of the treatment tank, a recirculation tank pump operative to route liquid from the recirculation tank to the input end of the treatment tank; and a discharge outlet for discharging treated effluent from the system. Liquid from the output end of the treatment tank can be selectively directed to the discharge outlet and at least one of the septic tank and the recirculation tank. When the system is in transit all liquid from the output end of the treatment tank is directed to one of the septic tank and the recirculation tank.

The present invention provides, in a second embodiment a method of treating waste water using a transit time, while the waste water is being transported from a first location to a second location, to treat the waste water. The method comprises the steps of: collecting a load of untreated waste water at a first location in a portable waste water treatment system; transporting the portable waste water treatment system to a second location, wherein the load of untreated waste water is treated while the portable waste water treatment system is in transit; and discharging treated effluent from the portable waste treatment system at the second location.

The present invention provides, in a third embodiment a method of treating waste water using a transit time, while the waste water is being transported from a first location to a second location, to treat the waste water. The method comprises the steps of: collecting a load of untreated waste water at a first location in a portable waste water treatment system; transporting the portable waste water treatment system to a second location, wherein the load of untreated waste water is treated while the portable waste water treatment system is in transit by first, directing the waste water to a septic tank to create clarified waste water and then filtering the clarified waste water; and discharging treated effluent from the portable waste treatment system at the second location.

The present invention provides an apparatus and method that allows waste water received by a portable waste water treatment system to treat waste water while stationary at a remote location and then the portable waste water treatment system can continue to treat the waste water while the portable waste water treatment system is in transit between a first location and a second location. This allows the transit time of the portable waste water treatment system to be utilized to improve the quality of the liquid in the portable waste water treatment system. Untreated waste water can be received by the system at a first location and during transport the waste water is treated by the portable waste water treatment system, improving the quality of the effluent discharged from the portable waste water treatment system when it has arrived at the second location.

In one embodiment of the invention, untreated waste water is introduced into a portable waste water treatment system and received in a dual chamber septic tank to clarify the waste water. The waste water is received by a first chamber in the septic tank for settling out solids from the waste water and from this first chamber the waste water then passes into a second chamber. From the second chamber of the dual chamber septic tank, the liquid then passes into a pump or recirculation tank to be diluted with liquid that has already been treated. From the recirculation tank this mixture of clarified liquid from the septic tank and treated recirculated liquid is pumped into a treatment tank. The treatment tank filters the liquid as the liquid passes through the treatment tank.

In one embodiment, the treatment tank comprises filter media, such as natural or manufactured high efficiency absorbent foam medium, engineered absorbent textile material or similar natural or manufactured light weight filter or other filter media suitable to biologically filter liquid passing through the filter media. In another embodiment the treatment tank comprises a mechanical filter system such as a membrane filtration, reverse osmosis or similar technology, either in addition to the filer media or as a substitute for the filter media. The liquid is introduced at an inlet end of the treatment tank, where the liquid will then pass through the filter media in the treatment tank and out an outlet end of the treatment tank. Liquid exiting the outlet end of the treatment tank is passed into a distribution box.

The distribution box is operative to direct the liquid to various components in the system depending upon the state of the portable waste water treatment system. If the portable waste water treatment system is stationary, the distribution box can direct a portion of the liquid for final discharge as treated effluent from the portable waste water treatment system onto the ground, if that is permitted at the location. The other portion of the liquid exiting the outlet end of the treatment tank is routed back to the recirculation tank to be mixed with liquid entering the recirculation tank from the septic tank in order to dilute the liquid coming from the septic tank. If the portable waste water treatment is in transit, a portion of the liquid exiting the treatment tank can be directed to the recirculation tank and the other portion of the liquid exiting the treatment tank directed back to the septic tank to keep all of the liquid in the portable waste water treatment system moving through the entire system.

When the portable waste water system is going to be in transit for a relatively short period of time and this time period will not be long enough to sufficiently treat all of the waste water in the portable waste water treatment system, the distribution box can direct liquid exiting the treatment tank back only to the recirculation tank. The liquid in the recirculation tank will continue to be passed through the treatment tank further treating it with every pass through the treatment tank causing the liquid in the recirculation tank to be passed through the treatment tank and treated a number of times making it highly treated and substantially increasing its quality. This liquid will continue to pass through the treatment tank until the portable waste water system reaches the new location with the result that a portion of the liquid in the portable waste water treatment system will be highly treated as a result of being passed through the treatment tank numerous times. Once the portable waste treatment system is at the second location a portion of this highly treated liquid can begin to be discharged from the portable waste water treatment system onto the ground surface, if it is permitted at the second location or alternatively discharged into a collection facility. The rest of the highly treated effluent in the recirculation tank can then be used dilute liquid entering the recirculation tank from the septic tank.

Typically, there will be liquid remaining in the septic tank when liquid is discharged from the portable waste water treatment system under normal operating conditions because only liquid from the recirculation tank and a portion of the liquid from the septic is discharged under normal operation tank (the amount of liquid that will be discharged from the septic tank under normal operation of the system will depend on the height of the outlet of the septic tank to the treatment tank in relation to the septic tank). This means there is usually some liquid remaining in the septic tank, even when liquid is discharged normally. However, the system can also be provided with a forced discharge conduit and treatment device. The forced discharge conduit is operatively connected to the septic tank, so that more liquid can be removed from the septic tank, than would be discharged under normal operation. Liquid routed through the forced discharge conduit is routed through a treatment device, typically a chlorination device, to quickly treat the liquid before it is discharged from the system, if necessary. In this manner, the forced discharge conduit can be used either to drain more of the liquid of the septic tank than would be discharged at a single time in normal operation, should it be necessary or desirable to do so.

Typically, all of the components of the system can be operated by a variety of power sources. Conventional AC power can be used to power the components when the system is stationary at a work site. When the system is in transit or AC power is not available at a worksite either AC power could be supplied by a on-board power generating device or alternatively, DC power from either a battery, a connection to a towing vehicle or stand alone solar PV system could be used to power the components in the system or any combination of these components.

It is contemplated that one of the purposes of the present invention is to service work camps that move from location to location in a continuous operation. Waste water generated at these work camps can be received by the portable waste water treatment system and treated while the portable waste water treatment system is stationary. When the work site is no longer needed and the camp is moved, the portable waste water treatment apparatus can be transported to the next location. Rather than having to discharge all of the liquid in the portable waste water treatment system before moving the portable waste water treatment system to the new location, the portable waste water treatment system can treat the waste water while enroute to the new location. Once the portable waste water treatment system arrives at the new location, the treated liquid can begin to be discharged at the new location and the portable waste water treatment apparatus can begin to receive new untreated waste water from the new site. By having the portable waste water treatment system treating waste water at a site and then using the transport time between a first location and a second location to treat the waste water, the present invention is able to begin discharging effluent that has been treated and substantially improved from the untreated waste water when the system arrives and the second location and can in many cases this treated effluent can be discharged on the ground at the new location.

Alternatively, if the portable waste water treatment system is to be used to transport waste water to a disposal site, the portable waste treatment system can be used to treat the waste water in transit to result in a better quality of resulting effluent at the disposal site. By increasing the quality of the effluent discharged by the portable waste water treatment system at a disposal site, the disposal site will often require less of a fee to dump the treated effluent than it would charge for dumping untreated waste water. Additionally, some disposal sites will not allow untreated waste water and by treating the waste water, the portable waste water treatment apparatus will be able to use a much wider range of disposal sites than if it was discharging untreated waste water, such as discharging the treated waste water at RV dumping grounds.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
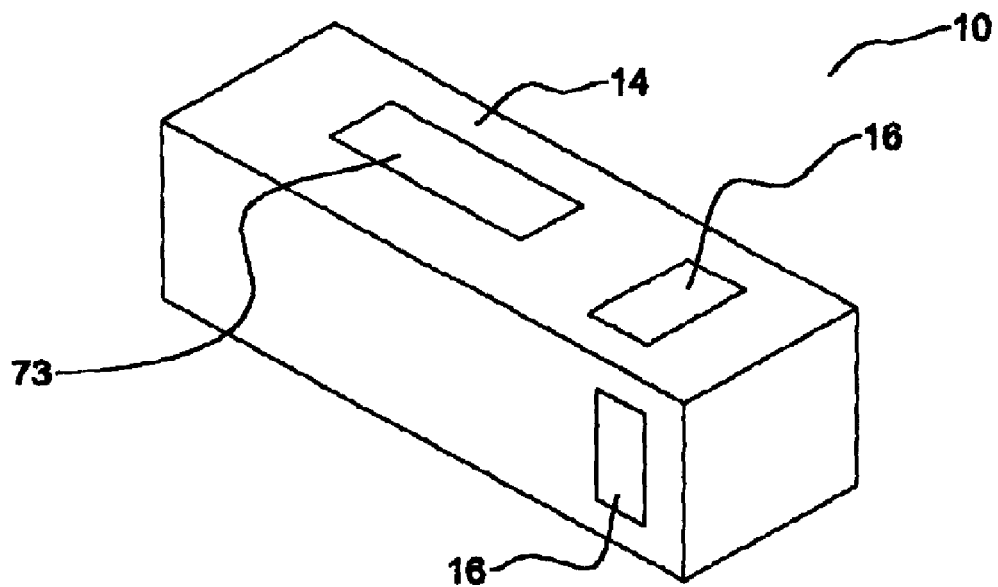
FIG. 1 is a perspective view of a portable waste water treatment system, as contemplated by the present invention.

FIG. 1 is a perspective view of a portable waste water treatment system 10. The portable waste water treatment system 10 is mobile by having the components of the portable waste water treatment system 10 mountable on a barge, boat, train or other vehicle. The portable waste water treatment system 10 typically comprises a housing 14 with a number of access doors 16 to allow access to the components of the portable waste water treatment system 10 housed within the outer housing 14. Typically, the housing 14 is insulated. Preferably, the portable waste water treatment system 10 will have a relatively low center of gravity to aid in the transportation of the portable waste water treatment system 10. To increase stability during transport, conveniently all tanks, pumps and associated equipment are securely attached to the portable waste treatment system 10.

Figure 2:
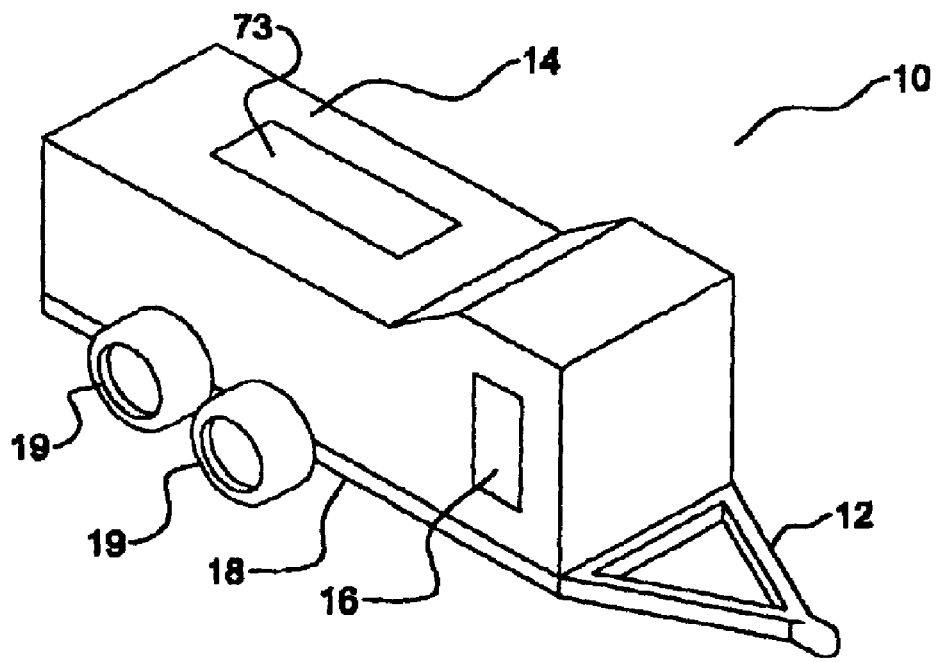
FIG. 2 is a perspective view of the portable waste water treatment system incorporating a chassis with wheels so that the portable waste water treatment system can be towed by a tow vehicle.

FIG. 2 illustrates the portable waste water treatment system 10 further comprising a trailer assembly 12 formed from a support structure 18 and wheels 19 so that the portable waste water treatment system 10 can be towed by a tow vehicle (not shown) such as a truck.

Figure 3:
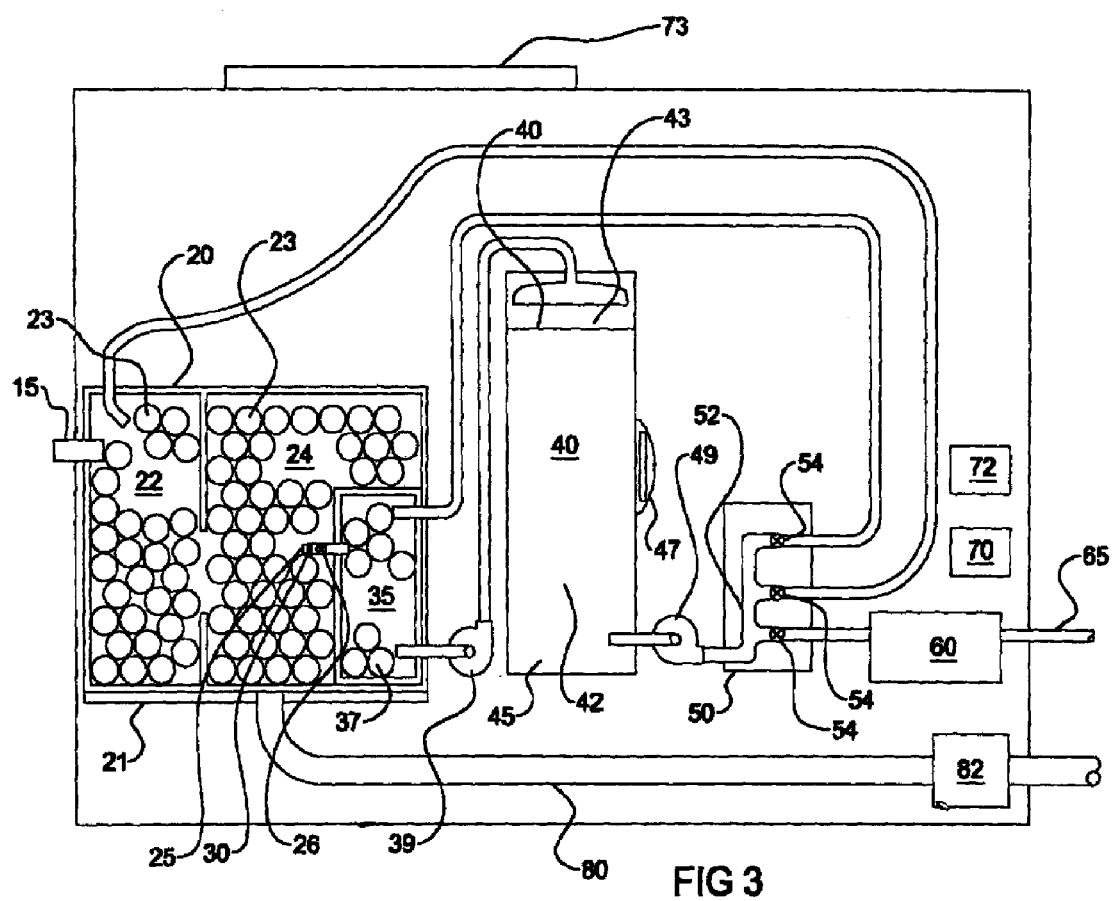
FIG. 3 is a schematic diagram of the internal components of the portable waste water treatment system of FIG. 1 or FIG. 2.

FIG. 3 is a schematic illustration of the internal components of the portable waste water treatment system 10. The internal components of the portable waste water treatment system 10 comprise: an inlet conduit 15; a septic tank 20; an effluent filter 30; a recirculation tank 35; a recirculation tank pump 39; a treatment tank 40; a distribution box 50; a finishing filter device 60; and a discharge outlet 65.

The septic tank 20 is typically a dual chamber septic tank that comprises a first chamber 22 and a second chamber 24 (although a single chamber septic tank could also be used). Untreated waste water (typically both black water and gray water) is clarified in the septic tank 20. Untreated waste water enters the first chamber 22 of the dual chamber septic tank 20 through the inlet conduit 15. In the first chamber 22 denser solids suspended in the incoming untreated waste water settle to the bottom of the first chamber 22 to form a sludge layer. Lighter solids, grease, etc. float to the top of the first chamber 22. Periodically, the sludge layer buildup in the first chamber 22 must be removed; however, numerous loads of waste water can be treated before the sludge layer builds up to the point where it must be removed. Liquid from the first chamber 22 then passes to the second chamber 24 of the dual chamber septic tank 20 where an outlet 25 of the septic tank 20 allows liquid in the second chamber 22 of the septic tank 20 to pass out of the septic tank 20.

Preferably, the septic tank 20 is provided with an aeration system 21 that introduces air into the septic tank 20 that further aids the treatment of liquid in the septic tank 20.

The septic tank 20 also typically comprises a baffle system 23 to reduce the movement of the liquid in the dual chamber septic tank 20 while the portable waste treatment system 10 is in motion. Generally, although not necessarily, the baffle system 23 will comprise a baffle system as disclosed in U.S. Pat. No. 6,308,856 to Spicklemire; however, any suitable baffle system could be used to reduce the movement of the liquid in the septic tank 20 while the portable waste water treatment apparatus 10 is in transit. In addition to reducing the movement of liquid in the septic tank 20, the baffle system 23 acts as a large attachment surface for biological growth in the septic tank 20.

From the second chamber 24 of the septic tank 20 the waste water is routed out the outlet 25 to the recirculation tank 35 through the effluent filter 30. The effluent filter 30 screens solids still present in the liquid out of the liquid before it reaches the recirculation tank 35. Typically, the recirculation tank 35 will also comprise a baffle system 37 to reduce the amount of movement of the liquid in the recirculation tank 35 during transport of the portable waste water treatment system 10.

During transport, the connection fittings between the dual chamber septic tank 20 and the recirculation tank 35 are subject to vibration and stresses. To eliminate any potential leakage of untreated the liquid contents, the dual chamber septic tank 20 can be modified so that the recirculation tank 35 is located inside the septic tank 20; however, this is not necessary.

From the recirculation tank 35, the recirculation tank pump 39 pumps liquid from the recirculation tank 35 to the treatment tank 40. By controlling the operation and timing sequence of the recirculation tank pump 39 the amount of liquid provided to the treatment tank 40 can be controlled.

The treatment tank 40 is operative to filter liquid passing through the treatment tank 40. In one embodiment, the treatment tank 40 contains filter media 42, which will biologically filter liquid passing through the filter media 41 in the treatment tank 40. Typically, this filter media 42 comprises Waterloo Biofilters™, as disclosed in U.S. Pat. No. 5,707,513 to Jowett et al., or textile media, as disclosed in U.S. Pat. No. 6,540,920 to Ball et al. However, any suitable filter media 42 such as any organic and/or inorganic medium such as charcoal, fibres, assembly of fibres, combination of fibres and combination of organic and inorganic medium, natural or manufactured high efficiency absorbent foam medium, engineered absorbent textile material or similar natural or manufactured light weight filter and treatment can be used.

In operation, liquid from the recirculation tank 35 is filtered by the treatment tank 40 by being directed by the recirculation tank pump 39 to an input end 43 of the treatment tank 40 where the liquid is spread evenly over a top surface 44 of the filter media 42 in the treatment tank 40. The liquid then passes through the filter media towards the output end 45 of the treatment tank 40 causing bacterial and microbial growth on the surfaces of the filter media 42 and absorbing oxygen from the pore spaces in between the filter media 42. This treated waste water then exits the treatment tank 40 at an output end 45 of the treatment tank 40 and this liquid is then routed to the distribution box 50. Generally, a fan system 47 is provided to constantly supply fresh air into the treatment tank 40 to aid the biological process in the treatment tank 40.

Treatment tank 40 may also comprise, either in addition to filter media 42 or as a substitute for filter media 42, a mechanical filter system such as nano filtration, membrane filtration, reverse osmosis or other type of mechanical filtration. In this embodiment, liquid passing through the treatment tank 40 is filtered by this mechanical filtration system. Liquid is directed by the recirculation tank pump 39 to an input end 43 of the treatment tank 40. The liquid then pass through the treatment tank 40 to exit the output end 45 of the treatment tank 40, where it is routed to the distribution box 50. The liquid is filtered by the mechanical filtering system as it passes through the treatment tank 40. The mechanical filtration system can be used in addition to the filter media 42 or as a substitute for the filter media 42.

The distribution box 50 selectively directs liquid from the output end 45 of the treatment tank 40 to the discharge outlet 65, septic tank 20 and recirculation tank 35. Which of these three options (the discharge outlet 65, the septic tank 20 and the recirculation tank 35) the liquid is selectively directed to once it exits the output end 45 of the treatment tank 40 will depend upon whether the portable waste treatment system 10 is stationary, in transport for a longer period of time, or in transport for a relatively short period of time. The distribution box 50 can comprise a manifold 52, connecting to conduits leading to the septic tank 20, recirculation tank 35 and discharge conduit 65 with a number of manually operated valves 54 allowing a user to route liquid through a number of different conduits manually. Alternatively, the valves 54 can be remotely activated so that a user can open and close the valves without having to gain access to the distribution box 50.

When the portable waste water treatment system 10 is stationary at a site, a portion of the liquid exiting the output end 45 of the treatment tank 40 can be directed back to the recirculation tank 35 and the remaining liquid exiting the output end 45 of the treatment tank 40 directed to the discharge outlet 65 where this liquid (or treated effluent) is discharged from the portable waste water treatment system 10. The portion of the liquid that is recirculated back to the recirculation tank 35 mixes with liquid entering the recirculation tank 35 from the outlet 25 of the septic tank 20 causing the incoming liquid from the septic tank 20, which has typically received less treatment and is therefore of poorer quality than the liquid that was recirculated back to the recirculation tank 35, to be diluted by the recirculated liquid.

The portion of the liquid that is to be discharged from the portable waste water treatment system 10 is routed through a finishing filter device 60 and out a discharge outlet 65. The finishing filter device 60 is a final finishing treatment for the effluent and typically comprises a UV filter, although other filters such as gravel rouging filter, ozone, chlorination or any combination of two or more polishing systems or other suitable filter means can be used. The treated effluent is finally discharged from the discharge outlet 65 of the portable waste water treatment system 10. In many cases, this treated effluent is of such a good quality that local regulations will allow the discharge effluent to be spread right on the ground surface.

When the portable waste water treatment system 10 is to be transported to a different site, the distribution box 50 can redirect the flow of the liquid leaving the output end 45 of the treatment tank 40 to the septic tank 20, the recirculation tank 35 or a combination of the septic tank 20 and the recirculation tank 35.

If the portable waste water system 10 is in transport for a relatively long period of time (typically more than 1 hour), the liquid exiting the output end 45 of the treatment tank 40 can be directed such that a portion of the liquid is directed to the first chamber 22 of the septic tank 20 and a remaining portion of the liquid is directed to the recirculation tank 35. Typically, the liquid is recirculated in approximately equal amounts between the first chamber 22 of the septic tank 20 and the recirculation tank 35. Liquid exiting the outlet end 45 of the treatment tank 40 and recirculated back to the to the recirculation tank 35, is mixed with liquid from the septic tank 20 causing the liquid from the septic tank 20 to be diluted by this treated liquid, while liquid from the output end 45 of the treatment tank 40 that is directed back into the first chamber 22 of the septic tank 20 causes liquid in the septic tank 20 to be circulated through the septic tank 20 and into the recirculation tank 35. On longer trips, by recirculating liquid exiting the output end 45 of the treatment tank 40 back to both the recirculation tank 35 and the first chamber 22 of the septic tank 20, all of the liquid in the portable waste water treatment system 10 can be treated.

If the portable waste treatment system 10 is in transport for a relatively short time (typically under 1 hour), the distribution box 50 can be set to direct all of the liquid exiting the output end 45 of the treatment tank 40 back into the recirculation tank 35. During the short transport of the portable waste treatment system 10, the liquid will continue to be recirculated through the recirculation tank 35 and the treatment tank 40, improving the quality of this liquid with each pass through the treatment tank 40. When the portable waste water treatment system 10 arrives at the next destination, the liquid in the recirculation tank 35 will be of sufficient quality that it can be used to start diluting liquid from the septic tank 20, once again, and/or discharged through the finishing filter system 60 and out the discharge conduit 65.

Typically, when liquid is only being recirculated back into the recirculation tank 35 without liquid being redirected back into the septic tank 20, as well, the liquid in the septic tank 20 will tend not to flow into the recirculation tank 35, however, to stop all liquid in the septic tank 20 from entering the recirculation tank 35 on short trips, a valve 26 may be located between the septic tank 20 and the recirculation tank 35 that can be closed to prevent any liquid entering the recirculation tank 35 when all the liquid exiting the output end 45 of the treatment tank 40 is being directed to the recirculation tank 35.

On shorter trips, by having only a portion of the total waste water in the portable waste treatment system 10 beings subjected to filtering in the treatment tank 40, a relatively substantial portion of the total waste water in the portable waste water system 10 can be sufficiently treated. In one embodiment of the invention, the septic tank 20 will have a capacity of approximately 2500 liters to 3000 liters and the recirculation tank 35 will have a capacity of approximately 600 liters to 700 liters with the result that on a short trip, the amount of effluent that has been treated is approximately 20 to 25% of the total waste water in the portable waste water treatment system 10. In this manner, once the portable waste treatment system 10 arrives at the next destination, a substantial portion of the waste water in the portable waste treatment system 10 will be of a significantly better quality then the untreated waste water that was loaded into the portable waste water treatment system 10 at the original or first destination. Once at the next location, the portable waste water treatment system 10 can begin discharging some of the treated effluent at this next location and almost immediately begin receiving new untreated waste water into the portable waste treatment system 10 or this highly treated effluent can be used to dilute liquid exiting the septic tank 20.

In normal operation, the septic tank 20 will typically always contain some liquid. When the portable waste water treatment system 10 discharges liquid at one time under normal operation, the discharged liquid will typically be the liquid from the treatment tank 40, the recirculation tank 35 and a portion of the liquid from the septic tank 20 (how much of the liquid in the septic tank 20 that is discharged in normal operation will be a result of the height of the outlet 25 of the septic tank 20 leading to the recirculation tank 35). For example, if the septic tank 20 is 3000 liters and the recirculation tank 35 is 700 liters, the portable waste water treatment system 10 if fully loaded with liquid, would be able, under normal operation, to discharge approximately ⅓ of load of liquid at one time. In order to force a discharge of more liquid from the septic tank 20, should it be necessary or desirable to do so, a forced discharge conduit 80 can be provided operably connected to the septic 20 so that more of the liquid in the septic tank 20 can be routed from the septic tank 20 and discharged from the portable waste water treatment system 10. Optionally, a treatment device 82 in the form of a chlorination device is placed inline with the forced discharge conduit 80 so that liquid removed from the septic tank 20 can be treated with chlorine to provide some treatment of the liquid before it is discharge from the portable waste water treatment system 10.

A person skilled in the art will appreciate that there will be a number of conduits, pumps, fittings, etc. needed to fully construct the apparatus as claimed. For example, although a single pump, recirculation tank pump 37 is illustrated in FIG. 2, a person skilled in the art will appreciate that a number pumps may have to be utilized in order to transfer liquids in the system as necessary. For example, a pump 49, located in proximity to the distribution box 50, is generally necessary, to pressurize the liquid passing through the distribution box 50 sufficiently so that the septic tank 20 and recirculation tank 35 can be reached by the liquid.

In addition, while the portable waste water treatment system 10 is stationary, there will typically be an AC power site at the location to supply power to the portable waste water treatment system 10, for the operation of pumps, heating system, aeration, etc. In transit or when no line power or host AC power is available at a site, DC power, supplied by the towing vehicle can be used to supply electrical power to the portable waste water treatment system 10 or alternatively, a battery system 70 can be provided to supply power to the portable waste water treatment apparatus 10. The battery system 70 can continuously be charged by the towing vehicle or can be charged by an auxiliary PV solar panel 73 or combination of both sources. Additionally, a generator 72 can be integrated into the portable waste water system 10 to either charge the battery 70 or provide AC power directly to the components in the portable waste water system 10.

It is also contemplated that the present invention will encompass a method of: receiving untreated waste water at a first location by a portable waste treatment apparatus and then transporting the portable waste treatment apparatus to a second location. While the portable waste treatment apparatus is in transit between the first and second location the portable waste water apparatus will utilize the time of transport by treating the waste water in the portable waste water apparatus during transport. When the portable waste water treatment apparatus arrives at the second location it can discharge treated effluent of a better quality that the untreated waste water first received by the portable waste water apparatus.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A portable waste water treatment system capable of treating waste water while the system is in transit, the system comprising:

an inlet conduit operative to receive waste water into a septic tank;

a recirculation tank operatively connected to an outlet of the septic tank;

a treatment tank operative to filter liquid passing through the treatment tank wherein liquid is introduced at an input end of the treatment tank and the liquid flows through the treatment tank to exit the treatment tank at an output end of the treatment tank;

a recirculation tank pump operative to route liquid from the recirculation tank to the input end of the treatment tank; and a discharge outlet for discharging treated effluent from the system, wherein liquid from the output end of the treatment tank can be selectively directed to the discharge outlet and at least one of the septic tank and the recirculation tank, whereby when the system is in transit all liquid from the output end of the treatment tank is directed to at least one of the septic tank and the recirculation tank.

2. The system of claim 1 wherein at least a portion of the liquid from the output end of the treatment tank is directed to the septic tank where the transit time is sufficiently long to allow all the liquid in the system to be treated effectively, and wherein all the liquid from the output end of the treatment tank is directed to the recirculation tank where the transit time is not sufficiently long to allow all the liquid in the system to be treated effectively.

3. The system of claim 2 wherein all the liquid from the output end of the treatment tank is directed to the septic tank where the transit time is sufficiently long to allow all the liquid in the system to be treated effectively.

4. The system of claim 2 further comprising a valve located between the septic tank and recirculation tank wherein when the transit time is not sufficiently long to allow the liquid in the system to be treated effectively, the valve can be closed when the system is in transit and all of the liquid from the outlet end of the treatment tank is routed to the recirculation tank.

5. The system of claim 1 wherein the treatment tank comprises filter media and liquid passing through the treatment tank is biologically filtered as the liquid passes through the filter media.

6. The system of claim 1 wherein the treatment tank contains a mechanical filtration system and liquid passing through the treatment tank is mechanically filtered as the liquid passes through the mechanical filter system.

7. The system of claim 1 wherein the septic tank is a dual chamber septic tank comprising a first chamber and a second chamber, wherein the inlet conduit is operatively connected to the first chamber and the outlet of the septic tank is operatively connected to the second chamber and wherein the first chamber is in hydraulic communication with the second chamber.

8. The system of claim 1 wherein the recirculation tank is located inside the septic tank.

9. The system of claim 1 wherein an effluent filter is located at the outlet of the septic tank for screening out solids from liquid passing through the effluent filter to the recirculation tank.

10. The system of claim 1 wherein a finishing filter is located at the discharge outlet to provide a final finishing treatment to liquid before it is discharged from the discharge outlet.

11. The system of claim 1 further comprises an aeration system operative to supply air into liquid in the septic tank.

12. The system of claim 1 wherein the septic tank comprises a baffle system throughout an interior of the septic tank for reducing the movement of liquid in the septic tank while the system is in transit.

13. The system of claim 1 wherein the recirculation tank comprises a baffle system for reducing the movement of liquid in the recirculation tank while the system in is in transit.

14. The system of claim 1 further comprising a fan system operative to route air into the treatment tank.

15. The system of claim 1 further comprising a forced discharge conduit operatively connected to the septic tank and operative to route liquid from the septic tank to be discharged from the system.

16. The system of claim 15 further comprising a treatment device in line of the forced discharge conduit operative to treat liquid passing through the forced discharge conduit.

17. The system of claim 1 wherein the system is powered, while the system is in transit, in at least one of the following ways: a battery, a generator and being connected to an electrical system of a vehicle transporting the system.

18. The system of claim 1 wherein the system is incorporated into a housing that substantially encloses the system.

19. The system of claim 18 wherein the housing further comprises a support structure having wheels and operative to be pulled by a tow vehicle.

20. The system of claim 18 wherein the housing is insulated.

* * * * *